July 10, 1956  A. C. LOVESEY  2,754,049
MEANS FOR REGULATING THE CHARACTERISTICS OF
MULTI-STAGE AXIAL-FLOW COMPRESSORS
Original Filed June 15, 1950
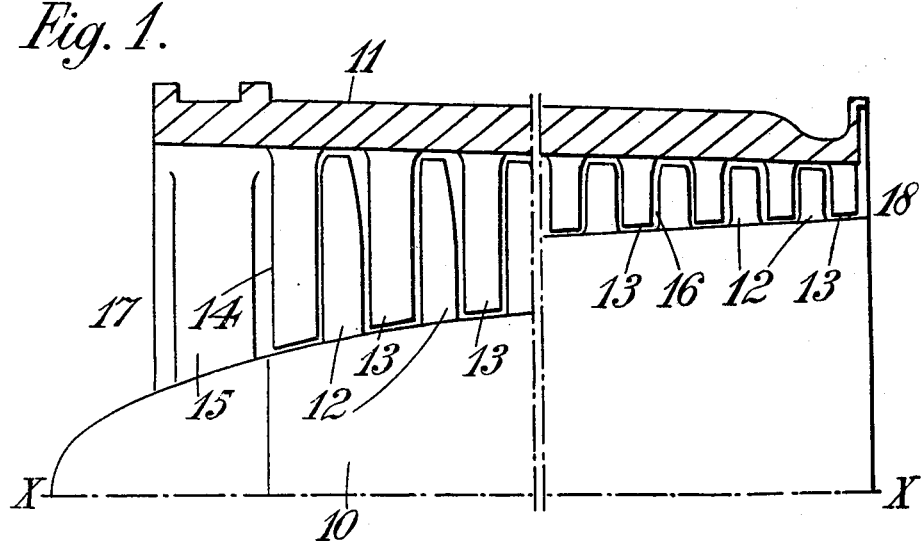
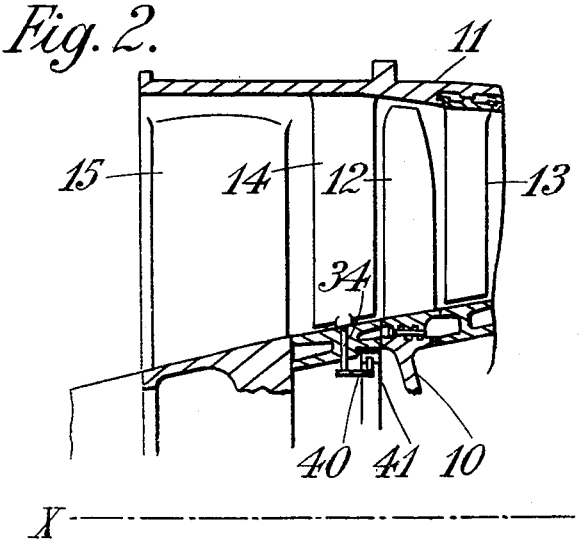

United States Patent Office 2,754,049
Patented July 10, 1956

2,754,049

MEANS FOR REGULATING THE CHARACTERISTICS OF MULTI-STAGE AXIAL-FLOW COMPRESSORS

Alfred Cyril Lovesey, Littleover, England, assignor to Rolls-Royce Limited, Derby, England, a British company Original application June 15, 1950, Serial No. 168,253, now Patent No. 2,689,680, dated September 21, 1954. Divided and this application May 10, 1954, Serial No. 428,648

Claims priority, application Great Britain June 16, 1949

4 Claims. (Cl. 230—114)

This application is divided out of copending application Serial No. 168,253, filed June 15, 1950, now Patent No. 2,689,680.

This invention relates to multi-stage axial-flow compressors which comprise two relatively rotating bodies, hereinafter referred to as a stator and a rotor. One only of said bodies may rotate or alternatively both may rotate in opposite directions. The invention has for its object to provide a means of regulating the characteristics of the compressor in a desirable manner over a wide range of operating conditions.

The invention has special importance in relation to multi-stage axial-flow compressors of the high compression ratio kind, such as are, for example, used in gas-turbine engines for aircraft, where it is desired to design the compressor to operate at high efficiency, particularly in the upper portion of the speed range, corresponding to medium or cruise power and maximum power conditions.

It is usual to design such a compressor to obtain efficient operation at a particular speed, or at a particular value of a condition, such as compression ratio, which is dependent upon speed, and such design involves the matching of the blade characteristics, including incidence and profile, to maintain a desired flow condition within the compressor, at such particular speed or condition.

For example, the compressor may be designed so as to maintain a constant mean axial velocity of the working medium from the inlet to the outlet of the compressor at a particular rotational speed of the compressor rotor, at a particular compression ratio, or at a particular corrected rotational speed of the compressor rotor. In order to give such conditions, the shape of the compressor-duct, i. e. the annular passage from the inlet to the outlet of the compressor, and the incidence and shape of the blading are chosen appropriately, which results in the compressor-duct converging as from inlet to outlet, the reduction in cross-sectional area of the duct of the compressor compensating for the increasing density of the working medium as it passes through the stages.

The annular duct will usually converge continuously from inlet to outlet but it may have a parallel sided portion, or even a slightly divergent portion, the actual design being such as to give a desired, usually a constant, axial velocity of flow at each cross-section of the passage at a certain design condition.

As previously mentioned, it is usual to choose the cruise or maximum power condition of running as the design condition for efficient operation; at speeds below that corresponding to the design condition, when the pressure rise per stage is less than the designed pressure rise, there will tend to be an accelerating axial flow of the working medium from inlet to outlet of the compressor-duct due to the overall density ratio being reduced compared with that at the particular design condition. This acceleration appears as a reduction of the axial velocity of the working medium at inlet and an increase of the axial velocity at outlet compared with those at the particular design condition.

The blade incidence and shape, being appropriately matched to maintain efficient operation of the compressor at the design speed, are incorrectly matched to maintain such operation at lower speeds, and further, particularly where the compressor is designed to operate at a high compression ratio, e. g. at 5 to 1, very serious difficulties are encountered in maintaining running at relatively slow speeds. Such difficulties, which are well known in the art, are attributable to the stalling of blades in the inlet stages of the compressor, due to the reduced axial velocity component of the working medium, which stalling may result in a complete breakdown of flow conditions in the compressor-duct.

Hitherto, it has been proposed that such difficulties should be overcome by the provision of means for adjusting the angular position of the stator-blades or of the rotor-blades, or of both, particularly in the inlet stages, for the purpose of varying the rotational swirl of the working medium in these stages appropriately to avoid the stalling characteristic mentioned.

Another proposal has been that valve means should be provided for bleeding off a quantity of the working medium at a stage intermediate between the inlet and outlet of the compressor. This arrangement provides for the maintenance of the axial velocity of the working medium in the low pressure stages of the compressor at a value approximately equal to that for the design condition without increasing axial velocity in the latter stages. The system, whilst providing certain desirable characteristics, clearly results in undesirable losses, and further involves installation and control problems.

It will be appreciated that the problems outlined above are aggravated when the compressor is designed for high compression ratios, as the convergence of the compressor-duct then becomes particularly marked; also in the use of high performance multi-stage axial-flow compressors in aircraft gas-turbine engines, the problem is further aggravated by the desirability of obtaining efficient operation in a very wide range of rotational speed and of altitude or intake pressure.

The main object of the present invention is to provide a novel construction of multi-stage axial-flow compressor in which the problems outlined above may be mitigated by adjusting, on change of rotor speed, the ratio, at the inlet of the compressor, of swirl velocity to axial velocity of the working fluid to a greater extent adjacent the inner wall of the compressor-duct than the extent if any to which it is adjusted adjacent the outer wall of the compressor-duct.

The invention may be more readily understood from the following description in which reference is made to the accompanying drawings, of which:

Figure 1 is a sectional elevation of a compressor of the kind with which the present invention is concerned, and Figure 2 shows a portion at the inlet of a compressor which embodies the invention.

Referring to Figure 1, the reference numeral 10 indicates the rotor-drum of the compressor which is mounted for rotation about the axis X—X and, together with the stator-casing 11, provides the walls of the compressor-duct 16. The compressor is a multi-stage compressor, each stage comprising a row of rotor-blades 12, mounted on the rotor-drum 10 for rotation therewith, and a row of stator-blades 13 mounted on the casing 11. The compressor is also provided with a row of fixed guide-vanes 14 mounted in the inlet 17 of the compressor-duct 16 upstream of the first row of rotor-blades 12.

The rotor-drum 10 is mounted on a shaft (not shown) which, at the inlet end of the compressor is mounted in a bearing (not shown) carried by support webs 15 which extend across the inlet 17 of the compressor-duct 16 from the stator-casing 11.

The compressor is designed to give a compression ratio of 5 to 1 at a selected rotational speed, and the compressor-duct 16 is dimensioned to give a constant axial velocity of the working fluid from the inlet 17 to the outlet 18 at the selected rotational speed. As a result, the cross-sectional area of the compressor-duct 16 is greater at the inlet 17 than it is at the outlet 18, i. e. the compressor-duct converges as from inlet to outlet.

Since the incidence and shape of the rotor-blades 12 and stator-blades 13 are appropriately matched to give efficient operation at the selected rotational speed, they are inappropriately matched for operation at other speeds; and serious difficulties are encountered in maintaining steady operation of the compressor at rotational speeds which are low compared with the selected speed. Such difficulties, which are well known in the art, are attributable, at least in part, to the reduced axial velocity of the working fluid through the inlet stages of the compressor, which is liable to result in stalling of the compressor-blades in these stages, which in turn may result in a complete breakdown of flow conditions in the compressor-duct.

In constructions of multi-stage axial-flow compressors according to the present invention, these well known drawbacks are mitigated by increasing, when stalling is likely to occur, the ratio of swirl velocity to axial velocity of the working fluid passing through an inlet row of stator-blades (i. e. a row of stator-blades upstream of a row of rotor-blades which is liable otherwise to stall when the rotational speed is low) to a greater extent adjacent the inner wall of the compressor-duct than the extent of the increase, if any, in such ratio adjacent the outer wall of the compressor-duct.

By doing this, two results are achieved. Firstly the axial velocity of the working fluid adjacent the outer duct wall is increased, as compared with a similar construction in which the invention is not employed operating at the same speed, so that the flow conditions adjacent the outer duct wall approach the design conditions more closely and the likelihood of stalling adjacent the outer duct wall is reduced. Secondly the direction of motion of the working fluid relative to the succeeding row of rotor blades is adjusted adjacent the inner duct wall to provide adequate compensation for the reduction in axial velocity of the working fluid, and so reduce the likelihood of stalling adjacent the inner duct wall as well.

One embodiment of the invention is shown in Figure 2. In this embodiment the inlet guide-vanes 14 are torsionally deformable. Each guide-vane 14 is anchored at its radially outer end to the compressor-casing 11 and, at its radially inner end, is provided with a trunnion 34 lying on an axis substantially radial to the axis of rotation X—X of the compressor rotor. A suitable operating mechanism, including a crank 40 for each guide-vane which engages with a ring 41 common to all the guide-vanes, is provided so that the trunnions 34 of all the guide-vanes can be rotated simultaneously so as to deform by torsion all the guide-vanes 14. When the trunnions 34 are rotated the ends of the guide-vanes adjacent the inner wall of the compressor passage rotate with them but the other ends of the guide-vanes are anchored to the casing 11 and so cannot rotate. The guide-vanes are thus torsionally deformed so that the outlet angle relative to the axial direction is adjusted to the full extent of the rotation of the trunnions adjacent the inner wall of the compressor passage but is adjusted by a progressively smaller amount along the length of the blade until there is no adjustment adjacent the outer wall of the passage because the guide-vanes are there anchored to the outer casing.

The ring 41 may be rotated by any suitable mechanism under control of a device sensitive to speed or to a condition depending on speed so that, at the design condition, the inlet guide-vanes 14 are not torsionally deformed at all but as the speed drops from the design condition the trunnions 34 are rotated to increase the outlet angle from the inlet guide-waves 14 adjacent the inner wall of the compressor-duct 16.

I claim:

1. A multi-stage axial flow compressor having an annular inner duct wall and an annular outer duct wall coaxial with the inner duct wall, said walls together defining an annular compressor-duct between them, and an inlet row of stator-blades, each of which extends from an inner end at the inner duct wall the whole way across the compressor-duct to an outer end at the outer duct wall, is torsionally deformable, whereby said ends are angularly displaceable relative to one another about the neutral axis of torsion of the blade, has said outer end anchored against rotation to said outer duct wall and has its inner end engaged in said inner duct wall to be rotatable about an axis substantially radial to the common axis of the said duct walls.

2. A multi-stage axial-flow compressor having an inner duct wall and an outer duct wall defining an annular compressor duct between them, and an inlet row of stator blades, each of which extends the whole way across the compressor duct, is torsionally deformable, has one of its ends rigidly fastened to said outer duct wall and has its other end pivotally mounted in said inner duct wall.

3. A multi-stage axial-flow compressor having an inner duct wall and an outer duct wall defining an annular compressor duct between them, an inlet row of stator blades, each of which extends the whole way across the compressor duct, is torsionally deformable, has one of its ends rigidly fastened to said outer duct wall and has its other end pivotally mounted in said inner duct wall, and means to rotate said other end in its pivotal mounting.

4. A multi-stage axial-flow compressor having an inner duct wall and an outer duct wall defining an annular compressor duct between them, an inlet row of stator blades, each of which extends the whole way across the compressor duct, is torsionally deformable, has one of its ends rigidly fastened to said outer duct wall and has its other end pivotally mounted in said inner duct wall, a crank connected to said other end, a ring to engage with the cranks of each of the blades, and means to rotate said ring including a device sensitive to the speed of the compressor, whereby on rotation of said ring the blades are torsionally deformed.

References Cited in the file of this patent

UNITED STATES PATENTS

| | | |
|---|---|---|
| 2,460,778 | Willgoos | Feb. 1, 1949 |

FOREIGN PATENTS

| | | |
|---|---|---|
| 486,761 | Canada | Sept. 23, 1952 |